Dec. 29, 1970     P. A. GAWLIK, SR     3,550,173
SELF-ALIGNING TAPS

Filed Feb. 13, 1969     2 Sheets-Sheet 1

Paul A. Gawlik, Sr.
INVENTOR.

BY *Clarence A. O'Brien*
and *Harvey B. Jacobson*
Attorneys

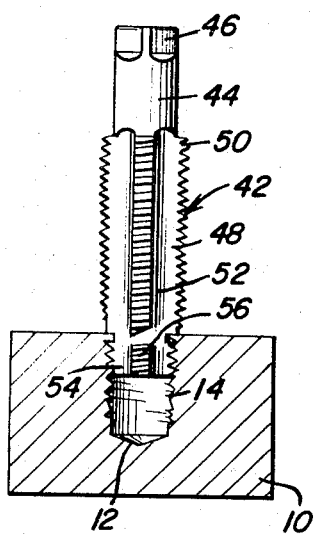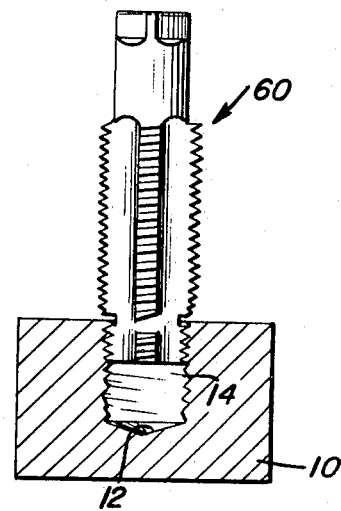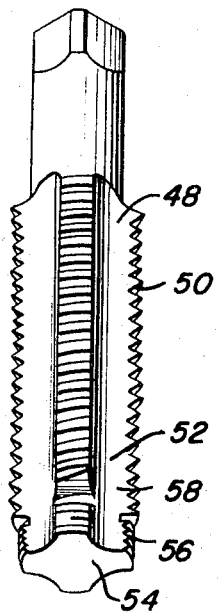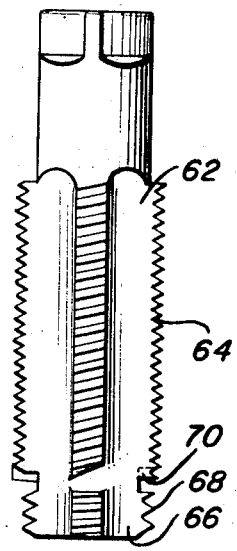

_United States Patent Office_

3,550,173
Patented Dec. 29, 1970

3,550,173
SELF-ALIGNING TAPS
Paul A. Gawlik, Sr., 3601 Monterrey St.,
Corpus Christi, Tex. 78411
Filed Feb. 13, 1969, Ser. No. 798,867
Int. Cl. B23g 5/06, 5/20
U.S. Cl. 10—140                    2 Claims

ABSTRACT OF THE DISCLOSURE

Taps for free-hand tapping of internal threads of any diameter desired to enable inserts to be placed in the internally threaded diameter to return the internal diameter to a predetermined size with the taps being self-aligning and eliminating the necessity of employing guide blocks and the like normally employed during a tapping operation.

---

The present invention generally relates to self-aligning taps and a method of use thereof in free-hand tapping of internal threads of any diameter desired without the use of guide blocks normally employed during a tapping operation.

In the construction of engines such as those employed in jet-powered aircraft and other type aircraft engines, internally threaded sockets are provided for receiving retaining cap screws, bolts and the like for retaining components of the engine in assembled condition. During normal maintenance, repair and use of such engines, the internally threaded sockets or bores become worn, burred, distorted and sometimes substantially stripped completely thus rendering the internal threads inoperative for receiving items normally threaded into the threaded socket or the like. When this condition occurs, one solution exists which involves drilling the bore to an oversize condition and tapping the bore. However, this requires the use of a larger threaded fastener in the larger diameter bore with the result that the assembly becomes nonstandard. To bring the threaded bore back to a standard internal diameter, there has been developed inserts generally in the form of a helical coil which are inserted into the internally threaded bore so that the insert will have a standard internally threaded bore to receive the standard size fastener. One type of commercially available insert is available under the trademark "Heli-coil." In using such an insert, it is conventional to employ a guide block receiving a standard drill for drilling the worn threads in an internally threaded bore. After the drilling operation to an oversize, the guide block is used with a standard insert tap which will internally thread the drilled bore so that an insert may be placed therein to return the bore to a standard diameter. Inasmuch as most rework of this type is done on an overhaul of an engine or the like, it is quite difficult to align the drill and tap freehand or with the use of a guide block because in most cases there is not enough room for such repairs on most jet and other aircraft engines.

Accordingly, it is an object of the present invention to provide self-aligning taps enabling the novel method of freehand tapping to be employed for enabling a bore having worn threads thereon to be internally threaded for receiving standard "Heli-coil" inserts.

Another object of the invention is to provide self-aligning taps in which the tap is provided with lead threads on the end thereof to engage the damaged threads in the socket or bore and cutting edges at the area of transition between the lead threads and the cutting threads on the tap for cutting or drilling the worn threads from the bore or socket thus enabling a single combined cutting and tapping operation with a single tool with the lead threads serving to guide the tap thus eliminating the use of the guide blocks and also to pull the cutting end edges and tapping threads into the bore or socket.

A further object of the invention is to provide a self-aligning tap having a guide surface on the end thereof which enters a previously drilled bore or socket for guiding the tap and aligning it with the bore or socket to facilitate formation of internal threads thereon for receiving an insert.

Still another important object of the present invention is to provide self-aligning taps and a method of freehand tapping which is simple in construction, easy to use, adapted for various uses and capable of being constructed in various sizes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 7 is a side elevational view similar to FIG. 3 but illustrating the tap with lead threads engaging the damaged threads in a bore or socket together with cutting edges at the lower end of the tapping threads to drill or cut off the damaged threads with the tapping threads then forming new threads on the interior of the bore or socket;

FIG. 8 is a perspective view of the self-aligning tap illustrated in FIG. 7;

FIG. 9 is a side elevational view similar to FIG. 7 but illustrating a larger diameter self-aligning tap for use with a twin insert; and FIG. 10 is a side elevational view of the self-aligning tap of FIG. 9.

Figure 1:
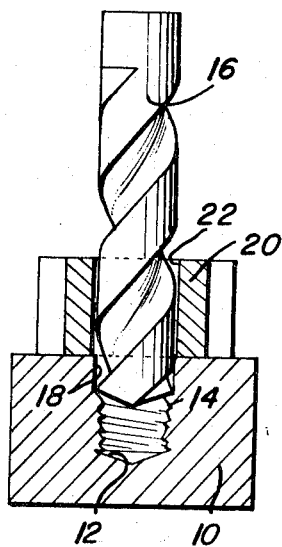
FIG. 1 is a sectional view illustrating schematically the conventional procedure of drilling a bore or socket in which the internal threads are worn by employing a guide block.
Figure 2:
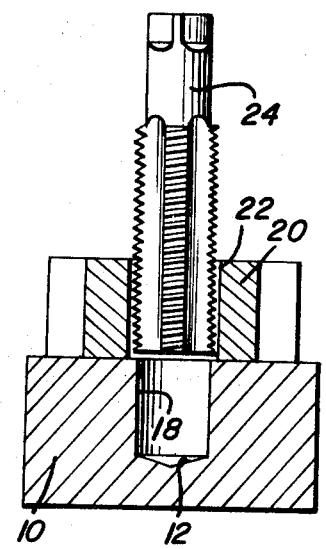
FIG. 2 is a view similar to FIG. 1 illustrating the use of a guide block with a conventional tap for internally threading the enlarged hole formed by the drilling operation in FIG. 1 so that an insert may be placed in the internally threaded bore.
Figure 3:
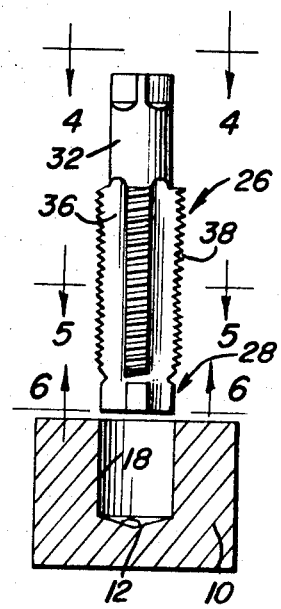
FIG. 3 is a view similar to FIG. 2 but illustrating the use of a tap having smooth surfaced guide surfaces on the end thereof engaging the drilled socket or bore to guide the tap during the tapping operation thereby eliminating the necessity for using a guide block such as illustrated in FIG. 2.
Figure 4:
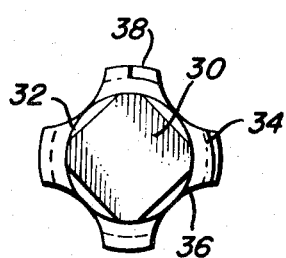
FIG. 4 is a top plan view of the tap of FIG. 3.
Figure 5:
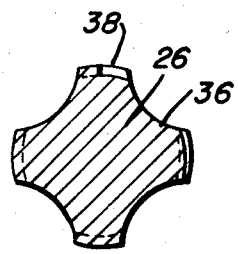
FIG. 5 is a transverse, sectional view taken substantially upon a plane passing along section line 5—5 of FIG. 3.
Figure 6:
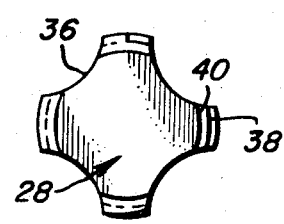
FIG. 6 is a bottom plan view of the tap illustrating the smooth surfaced guide structure on the bottom thereof.

Referring now to the drawings, the workpiece is designated by the numeral 10 and includes an internally threaded bore or socket 12 therein with the threads 14 being worn, distorted or the like such that a threaded fastener such as a bolt, cap screw or the like will not be securely anchored in the bore 12. While the present invention has utility wherever internal threaded bores or sockets are employed, it is especially adapted for use in conjunction with aircraft engines where various components are repeatedly removed and replaced which results in eventual wear of the threads. In repairing such engines during overhaul, when a threaded bore or socket having worn or distorted threads is encountered, the present-day procedure is to employ a conventional drill 16 to drill out the bore 12 by removing the worn or distorted threads 14 thus leaving a smooth surface 18 on the bore 12 as illustrated in FIG. 2. The drill 16 is received in a guide block 20 having a bore 22 therein of a size to closely receive the drill thus guiding the drill during the drilling operation. The guide block 20 is anchored to the workpiece 10 in any suitable manner with the bore 22 therethrough disposed in alignment with the bore 12 in the workpiece.

After the bore 12 has been drilled to an oversize with the smooth internal surface 18, the drill 16 is removed and a conventional thread forming tap 24 is inserted through the bore 22 in the guide block 20 to tap new threads into the interior surface of the bore 12 with the threads thus being formed being of an oversize diameter in relation to the original threads 14 formed in the bore 12. To bring the bore back to the standard size so that previously used standard size fasteners can be employed, a "Heli-coil" insert is disposed in the internally threaded bore thus bringing the bore 12 back to its original standard size.

Inasmuch as most repair work or overhaul work is performed in restricted space areas, in most cases there is not sufficient room for such repairs especially on most jet and other aircraft engines. It is quite difficult to align the drill 16 or the tap 24 with the socket or bore inasmuch as it is difficult to maintain the drill or tap perpendicular with the top surface and in alignment with the hole. A drill guide block and tap guide block is used which is either secured in place on the workpiece or held in place by one hand while drilling or tapping with the other which is a difficult operation and one in which it is extremely difficult to maintain accurate position of the drill or tap.

In order to eliminate use of the drill block 20 when rethreading the bore 12 having the surface thereof drilled out as at 18, a threading tap 26 is provided which has a threadless guide surface generally designated by numeral 28 at the lower end thereof. The tap 24 includes the usual polygonal or square upper end 30, a cylindrical shank 32 and longitudinally extending projections 34 which are separated from each other by relieved portions 36 generally in the nature of a conventional tap with segmental tapping threads 38 on the outer periphery thereof which are curved in a conventional manner generally conforming with the curvature of the threads being formed. The guide surface 28 is in the form of a plurality of extensions of the projections 34 having smooth exterior surfaces 40 which are arcuate and fit closely within the smooth surface 18 to guide the rotational movement of the tap 26 as the tapping threads 38 form threads in the surface 18. The lower ends of the tapping threads 38 taper inwardly slightly and merge with the exterior surface of the guide surfaces 40 to facilitate the formation of the threads in the bore 12. Since the guide surfaces 40 closely fit the bore 12, the tap 26 will be guided into and aligned with the bore 12 with the axis of the bore 12 and the axis of the tap 26 being substantially coincidental thereby enabling internal threads to be formed in the internal surface 18 of the bore 12 without requiring use of the guide block thus enabling both hands to be employed on the tool for rotating the tap thus further facilitating alignment of the tap and manipulation thereof.

Referring now specifically to FIGS. 7 and 8 of the drawings, the numeral 42 generally designates another type of self-aligning tap which includes structure for simultaneously removing the worn threads 14 and forming new threads on the interior surface of the bore 12 during a single operation. The tap 42 includes a cylindrical body or shank 44 having the usual square or polygonal upper end 46 for receiving an appropriate tool and longitudinally extending projections, ribs or blades 48 having tapping threads or teeth 50 thereon which are substantially conventional tapping structures with the area between the adjacent ribs or projections 48 being relieved as at 52. The lower end of the tap 42 is provided with an axial extension 54 generally in the form of extensions of the projections 48 with the extension 54 including thread segments 56 on the exterior surface thereof for threading engagement with the threads 14 left in the bore 12 even though these threads may be distorted and worn. The thread segments 56 thus form a lead screw for threading engagement with the threads 14 and will even tend to straighten and re-form the threads 14 slightly so that the thread segments 56 define a lead screw for the remainder of the tap thus retaining the tap in alignment with the bore 12 and urging the tap towards the bore so that the tapping thread segments 50 will be engaged with the bore 12. At the juncture between the blade or projection extensions 54 and the projections 48 themselves, the lower end of each projection is provided with an inclined surface generally defining a cutting edge 58 which forms a drill to remove the worn threads 14 as the tap 42 is pulled downwardly into the bore 12 by virtue of the lead screw segments 56 engaging the threads 14.

FIGS. 9 and 10 illustrate another embodiment of the self-aligning tap generally designated by numeral 60 which is substantially the same in construction as the tap 42 except that the diameter thereof is larger for enabling the bore to be enlarged for receiving a twin insert. The tap 60 includes the ribs or projections 62 having segmental tapping threads 64 thereon and extensions 66 having thread segments 68 thereon for engagement with the threads 14 in the bore 12 and the drilling or cutting edges 70 being formed on the juncture area between the thread segments 68 and the thread segments 64. As illustrated in FIGS. 7–10, the cutting edges 58 and 70 respectively are in the form of bevelled edges which define a leading cutting edge with the surface behind their leading cutting edge being inclined upwardly to relieve the cutting edge thereby enabling the bore 12 to be effectively drilled out by the cutting edges 56 or 70 with the new threads being formed in the smooth internal surface of the bore during the same operation thus the taps 42 and 60 are guided by the thread segments and led downwardly into the bore during which the old threads 40 are cut off or drilled out and then new threads formed on the smooth surface. With the use of the taps illustrated in FIGS. 3–10, accurate alignment is accomplished thus eliminating the use of drill motors, drills and guide blocks which will be of great savings in cost of materials and also result in a large saving of time required to repair an engine. The standard length of taps will not be affected because the entire length of the tap is rearely ever used and if desired, a plug tap can be used to a desired depth inasmuch as the taps of FIGS. 3–10 have completed and accurately started the threads on the interior surface of the bore. In other words, if threads are desired all the way to the bottom of the bore, it will be necessary to employ the taps of FIGS. 3–10 to start the threads on the bore and run them down as far as possible until the tap bottoms on the bottom of the socket or bore and then a plug tap now used will have a ground cutting end the same as the cutting surfaces in FIGS. 7–10 thus requiring no drilling to complete the depth of threads.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A self-aligning thread-forming tap for forming internal threads on a bore surface having damaged threads therein for the reception of an insert to return the bore to its previous size comprising an elongated shank having a plurality of longitudinal projections spaced circumferentially thereon, each longitudinal projection including a plurality of thread-cutting teeth segments on the periphery thereof for cutting threads in an internal bore when rotated into such a bore, and an axial extension on one end of the shank defining a guide engaging the bore to guide the thread-cutting segments therein, said axial extension including a plurality of longitudinal projections in alignment with and spaced longitudinally from the projections on the shank, said axial extension including segmental lead screw thread segments on the periphery thereof engaging the damaged threads on the internal surface of the bore for forming a lead screw for the thread-cutting segments on the shank, said projections on the shank each including a bevelled bottom cutting edge in longitudinally spaced relation to the longitudinal projections on the extension thus defining a longitudinally outwardly facing radial knife edge for cutting the damaged internal threads from the interior surface of a bore thus forming a smooth bore surface for engagement by the thread-cutting segments on the shank.

2. The method of restoring an internally threaded bore having worn threads therein to its previous dimensions consisting of the steps of threading lead screw segments on an axial extension on a thread-forming tap with damaged threads in the bore, rotating the thread-forming tap with the lead-screw segments moving the tap into the bore, engaging a radial cutting edge on the tap above the lead-screw segments with the damaged threads to remove the damaged threads and increase the diameter of the bore as the lead-screw segments move the tap into the bore, engaging thread-cutting segments on the tap above the cutting edge with the bore of increased diameter to form threads thereon, as the tap is rotated into the bore, removing the tap, and threading a resiliently lockable insert with internal threads into the threaded bore to return the internal threaded bore to its previous dimensions.

References Cited
UNITED STATES PATENTS

| | | | |
|---|---|---|---|
| 21,960 | 11/1858 | Hickok | 10—141 |
| 1,249,697 | 12/1917 | Walker | 10—1 |
| 1,812,147 | 6/1931 | Helin | 10—141 |
| 1,345,425 | 7/1920 | Wells | 10—147 |
| 1,475,561 | 11/1923 | Bath et al. | 10—140 |
| 2,325,627 | 8/1943 | Neilson | 10—141 |
| 2,389,548 | 11/1945 | Romanoski | 10—146 |
| 2,735,116 | 2/1956 | Mueller | 10—140 |
| 3,195,155 | 7/1965 | Groh | 10—1 |

CHARLES W. LANHAM, Primary Examiner

E. M. COMBS, Assistant Examiner

U.S. Cl. X.R.

10—147